United States Patent [19]

Goodzeit et al.

[11] Patent Number: 5,354,016

[45] Date of Patent: Oct. 11, 1994

[54] PIVOTED WHEEL ROLL CONTROL WITH AUTOMATIC OFFSET

[75] Inventors: Neil E. Goodzeit, East Windsor; Michael A. Paluszek, Lawrenceville, both of N.J.; Eric V. Wallar, New York, N.Y.

[73] Assignee: General Electric Co., East Windsor, N.J.

[21] Appl. No.: 922,306

[22] Filed: Jul. 30, 1992

[51] Int. Cl.$^5$ ................................................ B64G 1/32
[52] U.S. Cl. ..................................... 244/165; 244/164; 244/166; 244/171
[58] Field of Search ............... 244/164, 165, 166, 171; 318/582; 364/434, 459

[56] References Cited

U.S. PATENT DOCUMENTS 3,813,067  5/1974  Mork ................................. 244/165
5,259,577  11/1993  Achkar et al. ..................... 244/164

*Primary Examiner*—Michael S. Huppert
*Assistant Examiner*—Anne E. Bidwell
*Attorney, Agent, or Firm*—W. H. Meise; C. A. Berard; S. A. Young

[57] ABSTRACT

A 3-axis stabilized spacecraft includes roll and yaw magnetic torquers, and a momentum wheel oriented with its spin axis orthogonal to, and pivotable about, the roll axis. Roll control may be applied by pivoting the wheel. Secular increases in pivot angle may result in loss of control authority when the mechanical limits of the pivot are reached. The pivot angle is sensed, and an unloading control loop is closed, by which magnetic torquers are energized to torque the spacecraft, to return the pivot angle toward zero. The unloading control loop includes a bandpass filter, which eliminates constant components of pivot angle offset. This prevents the unload control loop from attempting to maintain the pivot at a position in which the wheel axis is offset from the desired normal to the orbit plane. Consequently, the magnetic torquers do not expend system energy attempting to maintain an undesirable attitude.

20 Claims, 3 Drawing Sheets

PIVOTED WHEEL ROLL CONTROL WITH AUTOMATIC OFFSET

BACKGROUND OF THE INVENTION

Three-axis stabilized spacecraft are widely used for various communication and sensing systems. Attitude control of the spacecraft may be accomplished by accelerating or decelerating momentum wheels or reaction wheels, by chemical thrusters, or by magnetic torquers, or by combinations thereof. In addition to accelerating or decelerating a wheel to generate a torque about its spin axis, the wheel may be mounted to the spacecraft by a pivot, whereupon a body torque may be generated at right angles to the spin axis by rotating the wheel mounting relative to the spacecraft body.

A prior art spacecraft 10 in FIG. 1 includes roll, pitch and yaw axes 20, 16 and 18, respectively, and earth sensor assembly 22 directed toward Earth 12 for determining pitch and roll, and a momentum wheel assembly (MWA) 24 mounted with its spin axis 26 approximately orthogonal to the orbital plane defined by axes 18 and 20, with the momentum wheel mounting 28 being pivotable about the roll axis 20. In such a system, the roll-representative signal from the earth sensor assembly (ESA) is processed by a control law, such as a proportional-integral (PI) control law, and is applied to drive a motor 30 affixed to the momentum wheel pivot, so as to adjust the roll position of the spacecraft in a feedback manner. As a result of external forces acting on the spacecraft, due to solar pressure, magnetic fields and the like, the pivot angle may increase in a secular manner, which is an increasing amplitude oscillation at the orbit rate. This may result in a loss of control authority when the mechanical limits (not illustrated) of the pivot system are reached.

To prevent loss of control authority, prior art systems, such as are described in U.S. Pat. No. 4,916,622, which is herein incorporated by reference, provide for automatic unloading of the pivot wheel angle. This is accomplished, in short, by sensing the pivot angle, and by, when the pivot angle exceeds a particular value, energizing a torquer in a direction which reduces the pivot wheel angle. Such prior art pivot angle unloading systems sense the pivot angle and feed a signal representative of the pivot angle to a torquer for driving the torquer in a direction which returns the pivot angle towards zero. In FIG. 1, the torquers are represented by magnetic coils 32, 34 and 36.

An improved attitude control system is desired.

SUMMARY OF THE INVENTION

A spacecraft attitude control system includes a momentum wheel assembly roll pivot under the control of roll representative signals. The pivot angle is sensed by a sensor arrangement, and the sensed pivot angle is applied by way of a highpass filter to control a magnetic torquer for unloading the pivot angle. In a particular embodiment of the invention, the pivot angle sensor is an integrator which counts stepper motor pulses.

DESCRIPTION OF THE DRAWING

FIG. 3b is a plot of magnetic torques of the system of FIG. 3a;

FIG. 4b represents magnetic torques of the system of FIG. 4a.

DESCRIPTION OF THE INVENTION

It has been discovered that prior art pivot angle control systems tend to require the application of excessive torques. This may be disadvantageous if the torques are provided by chemical thrusters, because more expendables are used for applying torque than the minimum required, which limits spacecraft lifetime. If magnetic torquers are used, electrical energy is expended at a greater rate than is absolutely necessary, which requires that the spacecraft solar panels be designed to produce more electrical energy than would be the case for minimum energy consumption. Also, the magnetic torquers must be designed to produce greater peak torques.

Figure 1:
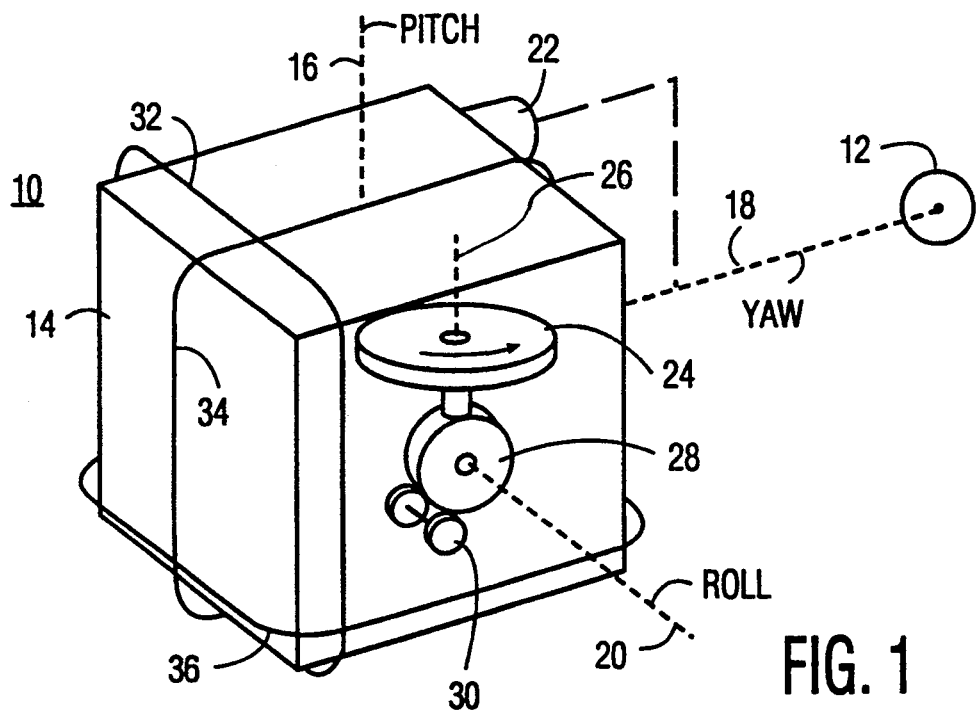
FIG. 1 is a perspective or isometric view, in simplified functional form, of a prior art spacecraft.
Figure 2:
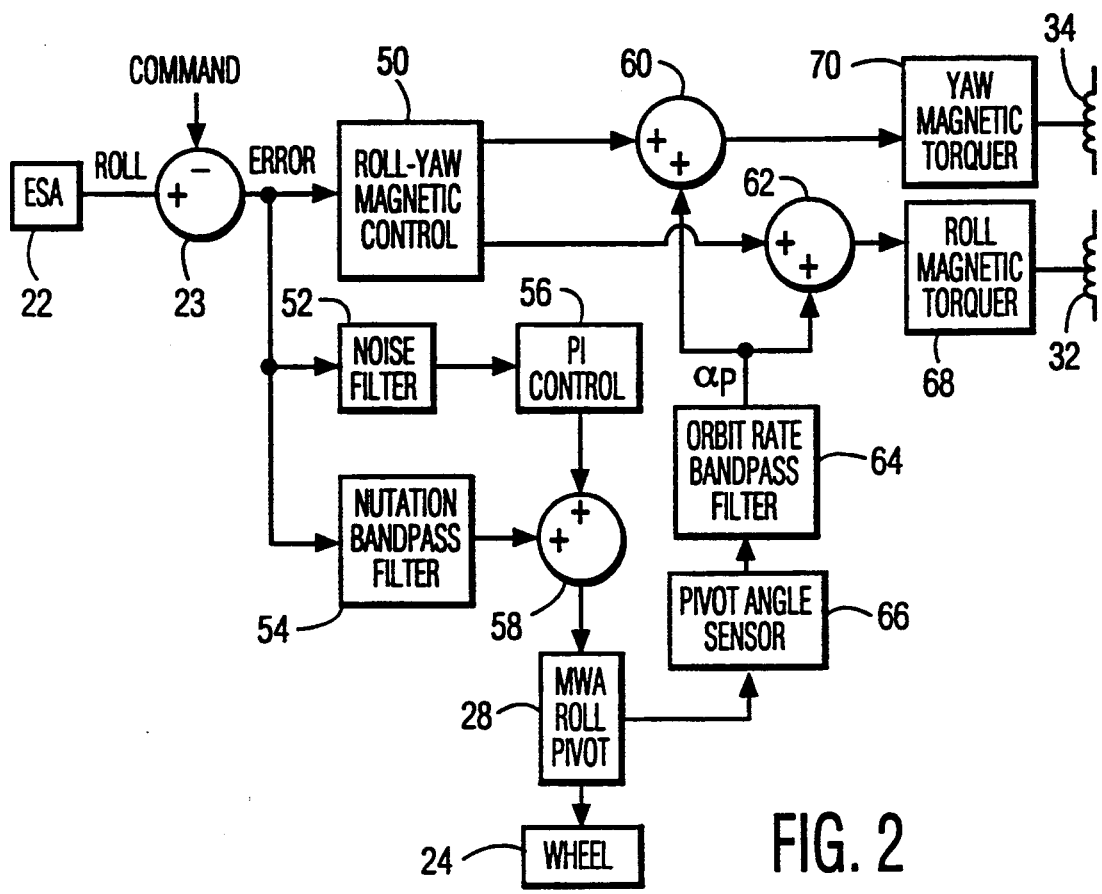
FIG. 2 is a simplified block diagram of a spacecraft control system in accordance with the invention.

The excessive power consumption arises due to unavoidable tolerances or misalignments of the spacecraft. For example, if earth sensor assembly 22 of FIGS. 1 and 2 is misaligned, or if the pivot of the momentum wheel assembly is slightly misaligned relative to the body of the spacecraft, the null position toward which the momentum wheel assembly pivot is unloaded is a position in which axis 26 of the pivot wheel is not parallel with pitch axis 16. Roll torque resulting from the misalignment of spin axis 26 relative to pitch axis 16 results in roll offset. The control system responds to the error and magnetically applies roll and yaw torques. The roll torque cancels the roll disturbance, but the yaw torque results in an undesired offset. The misalignment of the spin axis 26 relative to pitch axis 16 increases the yaw offset and roll magnetic torque demand.

A known method for reducing the additional demand on the magnetic torquers is to monitor the operation of the magnetic torquers, as for example by comparing the on-off times of the two opposite senses of control, and manually commanding a roll offset angle which equalizes the positive and negative components of torque demand. This manual offset must be updated periodically to take into account changes in environmental disturbance torques, and can easily be performed incorrectly, so that the torque demands are increased rather than decreased by the offset.

FIG. 2 is a simplified block diagram of an attitude control system in accordance with the invention. Elements of FIG. 2 corresponding to those of FIG. 1 are designated by like reference numerals. In FIG. 2, ESA 22 produces a roll signal which is applied to the noninverting (+) input port of a summing circuit 23. The commanded roll angle is applied to the inverting (−) input port of summing circuit 23, to produce a roll error signal. The roll error signal is applied to a roll-yaw magnetic control system illustrated as a block 50. Block 50 is a conventional proportional system, and produces error-proportional signals for application to roll and yaw magnetic torquers 68 and 70, respectively, for driving roll and yaw coils 32 and 34. As illustrated in FIG. 2, the yaw and roll error-proportional signals produced by control 50 pass through summing circuits illustrated as 60 and 62, in which additional control signals are added, which added signals are generated as described below.

The roll error signals produced by summing circuit 23 in FIG. 2 are also applied by way of a noise filter 52 and a proportional-integral (PI) control law illustrated as a block 56 to a first input of a further summing circuit 58. The roll error signals from summing circuit 23 are also applied to the input of a nutation bandpass filter illustrated as a block 54, which filters the roll error signals to produce further signals which are applied to a second input port of summing circuit 58, to be summed with the PI control signals. The sum of the PI control signals and the nutation control signals produced by summing circuit 58 are applied to MWA roll pivot assembly 28 for driving the pivot assembly which carries wheel 24. This results, as mentioned above, in pivoting the wheel about roll axis 20 which, due to the gyroscopic stiffness of the wheel, thereby controls the roll position of the spacecraft body.

A pivot angle sensor illustrated as a block 66 in FIG. 2 produces signals representative of the position of pivot 28 about roll axis 20. Pivot angle sensor 66 may be a simple variable resistance potentiometer connected for rotation with the pivot, and calibrated to produce appropriate signals. Known structures of this sort are known as "sine potentiometers". As an alternative, if pivot 28 is actuated by a stepper motor, pivot angle sensor 66 may be simply an integrator or counter which counts or sums motor steps in the positive and negative directions to provide a continuous indication of the position. However determined, the pivot angle representative signals produced by pivot angle sensor 66 are applied to an orbit rate bandpass filter illustrated as a block 64. Orbit rate bandpass filter 64 has a bandpass characteristic centered at a frequency representative of the orbital rate. For a geosynchronous spacecraft in earth orbit, orbit rate bandpass filter 64 may have a center frequency at about 11.6 $\mu H_z$. The orbit-rate bandpass filtered pivot angle representative signals are applied to noninverting input terminals of summing circuits 60 and 62 for being summed with the roll-yaw magnetic control signals, for providing MWA roll pivot unloading.

In operation, orbit rate bandpass filter 64 of FIG. 2 is AC-coupled, thereby decoupling the direct component of the pivot angle representative signal, which is produced by sensor 66, from the torque controllers. Consequently, the MWA roll pivot unloading torquers cannot respond to any constant offset. Viewed in another manner, the MWA roll pivot unloading function corrects only about a nominal value, which nominal value may change with time, and which is equidistant between positive and negative excursions of the unloading. As a result, the unloading controller cannot drive the MWA roll pivot toward a constant offset, which would require additional torques.

The pivot unloading system according to the invention conserves torque, and may be termed a torque conservation system (TCS). In an attitude control system including TCS, the ESA roll error signal is processed in low pass noise filter 52 of FIG. 2 by a characteristic $$G(s) = \frac{1}{(s^2 + 2p_s\omega_s + \omega_s^2)^2} \quad (1)$$

where $\omega_s$ is the filter natural frequency and $p_s$ is the damping ratio, which are selected for attenuation of ESA noise and to stabilize the nutation mode. The MWA pivot rate may be calculated as $$\text{Pivot Rate} = K_p\phi_f + K_i\int \phi_f dt$$

where $\phi_f$ is the filtered ESA roll angle; and $K_p$ and $K_i$ are the pivot position gain and integral gain, respectively.

For pivot actuated nutation damping, the ESA roll error signal is processed in bandpass filter 54 of FIG. 2 by the bandpass characteristic $$G(s) = \frac{s^2(s + \omega_1)}{(s^2 + 2p_n\omega_n + \omega_n^2)^2} \quad (2)$$

where $\omega_n$ is the spacecraft nutation frequency;

$p_n$ is the damping ratio; and $\omega_1$ is the phase-lead (numerator zero) break frequency.

The filtered ESA output may be used to calculate the nutation pivot rate NPR as $$NPR = K_n\phi_n$$

where $K_n$ is the nutation gain; and $\phi_n$ is the output of the nutation bandpass filter 54.

The values of $K_n$, $p_n$ and $\omega_1$ are selected for fast nutation damping.

For control of the yaw component of MWA momentum, the pivot angle representative signal produced by sensor 66 is processed by $$G(s) = \frac{s}{(s + \omega_o)(\tau_1 s + 1)} \quad (3)$$

where $\omega_o$ is the orbit rate; and $\tau_1$ is the numerator pole time constant selected for high-frequency noise attenuation.

The output $a_p$ of filter 64 of FIG. 2 may be used to compute the yaw and roll pivot unloading torque command, $T_x$ and $T_y$, respectively.

$$T_x = K_{ux} a_p$$

$$T_y = K_{uy} a_p$$

where $K_{ux}$ and $K_{uy}$ are the yaw and roll pivot unloading gains. As mentioned, bandpass filter 64 blocks DC, so the pivot unloading torque acts only to reduce secular yaw momentum, without affecting the constant component. The steady-state roll torque generated by the constant yaw pivot momentum cancels the total roll disturbance torque so that magnetic torquer control is not used to correct for this disturbance.

Figure 3A:
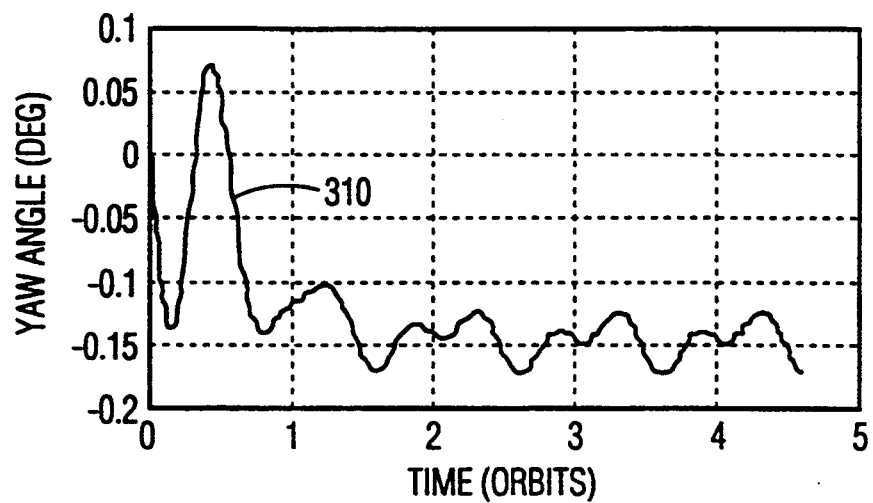
FIG. 3a represents yaw performance of a reference spacecraft system as a function of time.
Figure 3B:
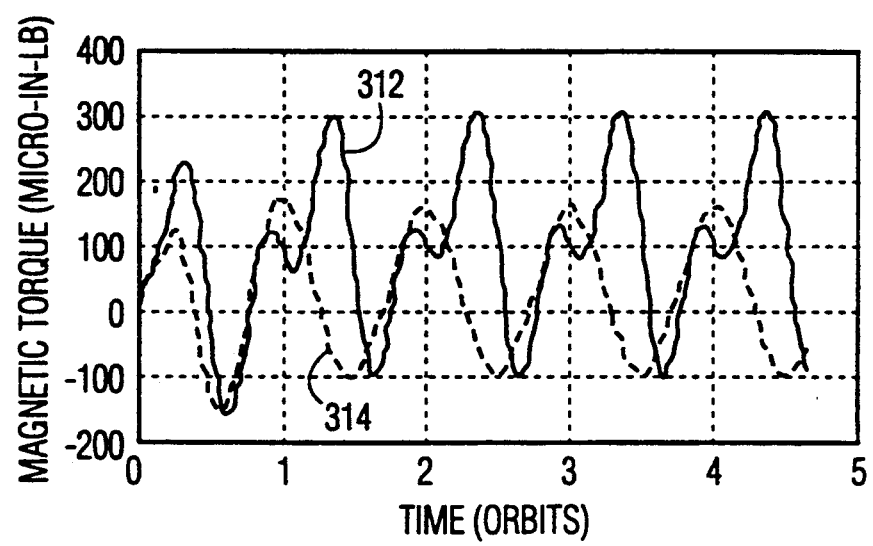
Figure 4A:
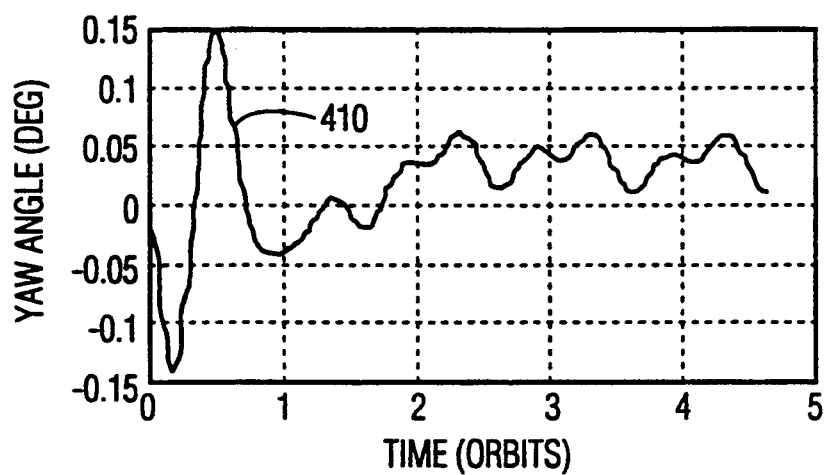
FIG. 4a represents yaw performance of a system in accordance with the invention as a function of time.
Figure 4B:
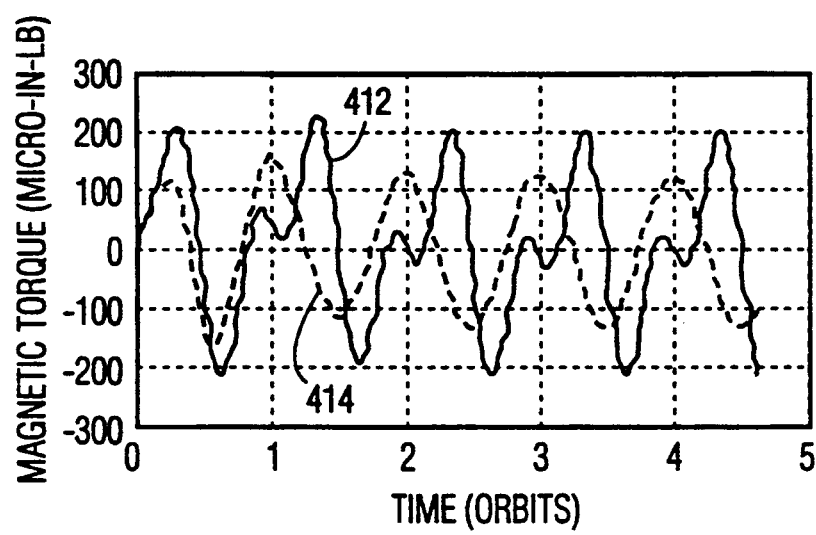

FIGS. 3a and 3b represent plots of yaw and magnetic torque calculated for a simulated large geosynchronous spacecraft under certain conditions. As illustrated in FIG. 3a, the peak steady-state yaw pointing error represented by plot 310 is about 0.17°, and the peak steady state yaw (plot 312) and roll (plot 314) magnetic control torques are 300 and 170 μin-lb, respectively. FIGS. 4a and 4b represent the same spacecraft as those of FIGS. 3a and 3b, fitted with a TCS according to the invention.

As illustrated by plot 410 of FIG. 5a, the peak steady-state yaw pointing error is about 0.06°, a 3:1 improvement over FIG. 3a. The peak steady-state magnetic yaw (plot 412) and roll (plot 414) torques are 200 and 130 μin-lb, a 33% and 23% control torque reduction, respectively. These reductions reduce the energy consumed by magnetic torquing during operation, thereby reducing the amount of energy which must be supplied by solar panels, which may therefore be made somewhat smaller and lighter. Also, the size and weight of the magnetic torquers themselves may be reduced, since they need not supply such large peak torques. These improvements are in addition to the spacecraft operation, which is simplified by elimination of a periodic manual offset.

Other embodiments of the invention will be apparent to those skilled in the art. For example, while a PI control law has been described, other laws, such as PID, could be used.

What is claimed is:

1. A system for three-axis control of a spacecraft in an orbit about a heavenly body having a center of mass, which orbit defines an orbit plane, said system comprising:

a spacecraft body associated with a pitch axis nominally orthogonal to said orbit plane, a roll axis parallel to the direction of orbital motion, and a yaw axis extending between the centers of mass of said spacecraft body and said center of mass of said heavenly body;

a wheel adapted for being spun about a spin axis, and for producing torques about said spin axis in response to angular acceleration;

wheel mounting means for supporting said wheel with said spin axis orthogonal to said roll axis, said wheel mounting means being pivotable about said roll axis;

wheel mounting drive means coupled to said body and to said wheel mounting means for driving said wheel about said roll axis in response to a wheel drive signal, whereby said body may be torqued about said roll axis, said wheel mounting means being movable about said roll axis from a nominal position to at least one travel limit;

roll attitude sensing means coupled to said body for generating roll attitude signals representative of a desired positioning of said yaw axis of said body relative to inertial space;

roll control means coupled to said roll attitude sensing means and to said wheel mounting drive means for comparing said roll attitude signals with signals representing said desired positioning of said yaw axis for forming a roll error signal, and for applying said roll error signal to said wheel mounting drive means, whereby said yaw axis may be positioned by control of said roll, but said wheel mounting drive means may eventually reach said travel limit, whereupon further roll control may not be possible;

yaw torquing means coupled to said body and controllable in response to yaw torquer drive signals, for producing torques about said yaw axis in response to said drive signals;

spin axis position determining means responsive to the position of said wheel mounting means about said roll axis for generating an unload error signal representative of at least the direction in which said wheel mounting means departs from said nominal position;

unload control signal processing means coupled to said spin axis position determining means and to said yaw torquing means, for processing said unload error signal by at least high-pass filtration for generating said yaw torquer drive signals, and for applying said yaw torquer drive signals to said yaw torquing means for unloading said wheel mounting means toward a position in which the constant roll torque generated by the offset of said spin axis from a normal to said orbital plane counteracts the constant component of environmental roll torque.

2. A system according to claim 1, wherein said wheel is a momentum wheel.

3. A system according to claim 1, wherein said wheel mounting drive means comprises an electric motor.

4. A system according to claim 3, wherein said motor is a stepping motor.

5. A system according to claim 4, wherein said spin axis position determining means comprises means coupled to said stepping motor for determining the relative amount of actuation in two opposite directions.

6. A system according to claim 1, wherein said roll attitude sensing means comprises an earth sensor.

7. A system according to claim 1, wherein said yaw torquing means comprises magnetic torquing means.

8. A system according to claim 1, wherein said spin axis position determining means comprises resistance means.

9. A system according to claim 8, wherein said resistance means includes a potentiometer.

10. A system according to claim 1, wherein said unload control signal processing means includes bandpass filter means including a combination of low-pass and said high-pass filtration.

11. A system according to claim 10, wherein said bandpass filter means has a pass frequency corresponding to the orbit rate.

12. A system according to claim 1, further comprising yaw magnetic torquing control means coupled to said roll control means and to said unload control signal processing means for processing said roll error signal by a proportional characteristic, for forming a component of said yaw torquer drive signals, and for summing said component of said yaw torquer drive signals with said yaw torquer drive signals produced by said unload control signal processing means.

13. A system according to claim 12, further comprising:

roll torquing means, coupled to said body, and controllable in response to roll torquer drive signals, for producing torques about said roll axis in response to said roll torquer drive signals;

roll magnetic torquing control means coupled to said roll control means and to said roll torquing means, for processing said roll error signal by a proportional characteristic, for forming a component of said roll torquer drive signals, and for summing said component of said roll torquer drive signals with said yaw torquer drive signals produced by said unload control signal processing means.

14. A 3-axis attitude control system for a spacecraft orbiting a heavenly body in an orbit defining an orbital plane, said system comprising:

a spacecraft body associated with a pitch axis nominally orthogonal to said orbit plane, a roll axis parallel to the direction of orbital motion, and a yaw axis nominally extending between the centers of mass of said spacecraft body and said heavenly body;

a wheel mounted for rotation about a spin axis, which spin axis is orthogonal to, but pivotable about said roll axis, for producing torques about said spin axis in response to acceleration of said rotation of said wheel;

wheel pivot drive means coupled to said wheel and to said body, for pivoting said wheel spin axis about said roll axis under the control of a wheel pivot drive signal, whereby said body may be torqued about said roll axis;

roll attitude sensing means coupled to said body, for generating roll error signals representative of the deviation of said body from a desired roll attitude;

first filtering means coupled to said roll attitude sensing means for filtering said roll error signals to produce noise-reduced roll error signals;

control law processing means coupled to said first filtering means, for processing said noise-reduced roll error signals by at least proportional and integral characteristics, to produce control law signals;

second filtering means coupled to said roll attitude sensing means, for filtering said roll error signals for producing nutation correction signals;

summing means coupled to said control law processing means, to said second filtering means, and to said wheel pivot drive means, for driving said wheel pivot drive means with a pivot drive signal including the sum of said control law signals and said nutation correction signals;

pivot angle sensing means coupled to said wheel pivot drive means, for generating pivot angle signals representative of the angle of said pivot;

bandpass filter means coupled to said pivot angle sensing means, and centered at a frequency related to the orbit rate, for bandpass filtering said pivot angle signals to produce correction signals;

magnetic torquer signal processing means coupled to said roll attitude sensing means, for processing said roll error signals by at least scaling, for forming components of roll and yaw command signals; and roll and yaw magnetic torquing summing means coupled to said magnetic torquer signal processing means, to said bandpass filter means, and to said roll and yaw magnetic torquers, for summing said correction signals with said roll and yaw command signals, to produce roll and yaw drive signals, and for applying said roll and yaw drive signals to said roll and yaw torquers, respectively.

15. A system according to claim 14, wherein said second filtering means comprises bandpass filter means.

16. A system according to claim 14, wherein:

said wheel pivot drive means comprises a stepping motor, which stepping motor is associated with pulses representing each step; and said pivot angle sensing means comprises counting means coupled to said stepping motor, for summing said pulses in an up-down manner, whereby the cumulated count represents the current angle of said pivot.

17. A method for 3-axis attitude control of a spacecraft including a body, an earth sensing arrangement, roll and yaw magnetic torquers and a wheel having a spin axis, which wheel is mounted with its spin axis orthogonal to and pivotable about a roll axis, said spacecraft orbiting a heavenly body in an orbit plane;

said method comprising the steps of:

operating said earth sensing arrangement for forming roll signals representative of the roll attitude of said spacecraft;

subtracting commanded roll attitude from said roll signals, for generating roll error signals filtering said roll error signal to produce filtered roll error signal;

generating PI signals including components proportional to said filtered roll error signal, and proportional to the integral of said filtered roll error signal;

controlling a pivot position of said wheel about said roll axis in response to said PI signals, for reducing roll position error;

generating pivot angle signals representative of the angle of pivot of said wheel;

filtering said pivot angle signals with at least a high-pass characteristic, to form pivot-derived magnetic torquer drive signals; and driving said yaw magnetic torquer with magnetic torquer drive signals including said pivot-derived magnetic torquer drive signals.

18. A method according to claim 17, comprising the further steps of:

at least scaling said roll error signals to produce roll-derived magnetic torquer drive signals;

summing together said pivot-derived and roll-derived magnetic torquer drive signals to produce composite magnetic torquer drive signals; and driving said yaw magnetic torquer with magnetic torquer drive signals including said component magnetic torquer drive signals.

19. A method according to claim 18, comprising the further steps of:

at least scaling said roll error signals to produce further roll-derived magnetic torquer drive signals;

summing together said further roll-derived magnetic torquer drive signals with said pivot-derived magnetic torquer drive signals to produce further composite magnetic torquer drive signals; and driving said roll magnetic torquer with magnetic torquer drive signals including said further composite magnetic torquer drive signals.

20. A method according to claim 19, comprising the further steps of:

bandpass filtering said roll error signal for generating nutation correction signals; and summing said nutation correction signals with said PI signals.

* * * * *